United States Patent Office 3,503,999
Patented Mar. 31, 1970

3,503,999
PROCESS FOR THE MANUFACTURE OF CITRACONIC ACID ANHYDRIDE
Helmut Pichler, Lussstrasse 31, Karlsruhe-Durlach, Germany, and Fritz Obenaus, Lipper Weg 195, Marl, Germany
No Drawing. Filed July 21, 1967, Ser. No. 654,978
Claims priority, application Germany, July 29, 1966, P 40,083
Int. Cl. C07d 5/10
U.S. Cl. 260—346.8     12 Claims

ABSTRACT OF THE DISCLOSURE

A process for economically producing citraconic acid anhydride by conversion of gases containing isoprene in mixture with oxygen or oxygen containing gases at temperatures between 200° C. and 500° C. in the presence of a $V_2O_5$-catalyst or a $SnO_2$ and $V_2O_5$ containing catalyst.

This invention relates to a process for the manufacture of citraconic acid anhydride by catalytic gas phase oxidation of isoprene.

Citraconic acid anhydride and citraconic acid obtained by addition of water to the former, as well as itaconic acid and mesaconic acid, which can be easily obtained by heating an aqueous solution of citraconic acid, possess well known properties, which permit their extensive application in industry. It can be seen from the patent literature that the acids, as well as their anhydrides, are successfully used as antioxidants for oils and fats, as additives for drying oil in order to get harder films, for improving the polymers e.g. from styrenes, epoxides or methylacrylic acid ester, as auxiliary materials for textiles, etc. However, the economical significance of citraconic acid anhydride and of the other above mentioned acids, which can be obtained from citraconic acid anhydride, has been rather minor until now. Their application on a large scale has been prevented because of the fairly high price of these substances as a result of the considerable expenses involved in the process known till now for their manufacture.

It has been known for a long time that citraconic acid or its anhydrides can be obtained with relatively good yields by the thermal decomposition of citric acid. However, this method of manufacture has the disadvantage that the raw material, namely citric acid, itself is costly, as a result of which the application of this process has been rather limited. Another well known process, which has been also carried out on a technical scale, is the production of itaconic acid by surface or submerged-culture fermentation of sugar or molasses. Naturally, this biological process requires a long time, as a result of which the production on a technical scale is associated with a correspondingly large layout for the plant and the yields are relatively low.

In contrast to the possibility of producing with fairly high yields the product maleic acid anhydride, which is similar in its structure to citraconic acid anhydride, by the catalytic gas phase oxidation of certain hydrocarbons, e.g. benzene, till now no similar and simple method for manufacturing citraconic acid anhydride with technically utilizable yields has been found. Citraconic acid anhydride is obtained only in traces in the product of an analogous catalytic gas phase oxidation of toluene or other methylaromatics e.g. xylene, cresol, etc. a maximum yield of only 10.5 wt. percent of citraconic acid anhydride has been obtained by a well known new process for the manufacture of citraconic acid anhydride, whereby the gas phase oxidation of a definite fraction of hydrocarbons, which contains about 60% olefins with 4, 5, and 6 carbon atoms and which is obtained by the cracking of petroleum, is carried out along with air over a vanadium oxide catalyst containing arsenic acid. Other processes, which give a higher yield of citraconic acid anhydride by the catalytic gas phase oxidation of hydrocarbons, have not been known until now.

This invention proposes a process, which is simple and easy to accomplish, for the manufacture of citraconic acid anhydride and from it obtainable secondary products, namely citraconic acid, itaconic acid and mesaconic acid, by the catalytic gas phase oxidation of hydrocarbons, whereby considerably higher yields of citraconic acid anhydride are obtained. By the catalytic gas phase oxidation of gases containing isoprene in mixture with gases containing oxygen, in the temperature range of 200° and 500° C. over a catalyst containing vanadium oxide, it is possible to obtain up to 34.6 wt. percent of citraconic acid anhydride on the basis of converted diolefins. Naturally, gas mixtures containing one of the feed components, i.e. either the gas containing diolefins or the gas containing oxygen, is used in large excess in order to avoid explosions. Preferably, out of convenience, air, as the gas containing oxygen, is used in large excess.

The conversion takes place with extraordinarily good yields by using essentially pure isoprene.

Catalysts containing vanadium oxide and tin oxide have proved to be extremely advantageous in the process of the present invention. Considerable yields of citraconic acid anhydride have been obtained by using these catalysts in the temperature range of 250° to 400° C. The best results are obtained by using a mixture obtained by mixing essentially pure isoprene with air in the ratio of 1 volume of isoprene to 80 to 200 volumes of air, a catalyst of the formula $2SnO_2 \cdot V_2O_5$, a temperature between 275° and 300° C., and a contact time with catalyst of 0.05 to 5 seconds, preferably 0.5 second.

The following examples illustrate the invention:

EXAMPLE I

A mixture of isoprene with air, containing approximately 0.8 volume percent of isoprene, is converted by contact times of a few tenths of seconds at a temperature of 274° C. to 330° C. over a tin-vanadate catalyst of formula $2SnO_2 \cdot V_2O_5$. The conversion of isoprene and the carbon oxides formed were determined by gas chromatographic analysis of the gas samples drawn simultaneously from the inlet and outlet gases. The product gas was washed in bottles filled with acetone and cooled by Dry Ice and the resulting product solution was also analyzed gas chromatographically. The identification of the products of oxidation was carried out using a mass spectrometer.

Under the said ranges of reaction conditions, citraconic acid anhydride constituted the major portion of the partial oxidation products with 20 to 35 weight percent or 12 to 21 mole percent of the converted isoprene. Along with the citraconic acid anhydride an appreciable amount of carbon monoxide, carbon dioxide and water was produced. Acetic acid appeared in the chromatogram of the acetone solution as the second largest component of the partial oxidation. From the other 6 to 7 detectable products, two products, being quantitatively significant, were identified by means of the mass spectrometer as 3-methyldihydrofuran and furan-3-aldehyde.

The results of an experiment, with the highest yield of citroconic acid anhydride, are given in the following table, whereby the products and their yields are expressed as percentages of the theoretically possible yields based on the introduced and converted isoprene. Product yields by the oxidation of isoprene over a $SnO_2 \cdot V_2O_5$ (0.827 vol.

percent isoprene in air mixture; 288° C.; 0.47 sec. contact time).

| Reaction products [1] | | Yields (Percent Theoretical) | |
|---|---|---|---|
| | | From feed | From conversion (=24.0%) |
| Furan-3-aldehyde | 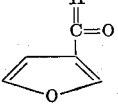 | 0.39 | 1.6 |
| 3-methyldihydrofuran | 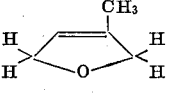 | 1.15 | 4.8 |
| Citraconic acid anhydride | 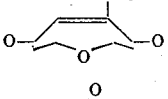 | 4.95 | [2] 20.7 |
| Acetic acid | 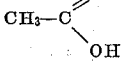 | 1.62 | 6.7 |
| Carbon monoxide | CO | 4.90 | 20.4 |
| Carbon dioxide | $CO_2$ | 10.5 | 43.9 |

[1] Analytically determined products and unconverted isoprene contained 98.6% of the carbon introduced as isoprene.
[2] This yield corresponds to 34.6 weight percent of citraconic acid anhydride on the basis of converted isoprene.

EXAMPLE II

In another experiment the oxidation of isoprene was carried out over a pure fused $V_2O_5$ catalyst under the conditions mentioned in Example I. Although thereby a considerably reduced conversion of isoprene was obtained, the yield of citraconic acid anhydride on the basis of converted isoprene was approximately of the same order.

The reason for the selective formation of citraconic acid anhydride in comparison to other products may be cited as resulting from the conjugated double bond in isoprene.

The preparation of the catalyst was carried out as described below.

90 grams of $NH_4VO_3$ were dissolved by boiling in a mixture of 125 ml. diethanolamine and 150 ml. water. 200 grams $SnCl_4$ were added in small portions to the solution with stirring. A precipitate resulted, which was initially yellow and later dark green. After neutralizing with 15 percent aqueous ammonia solution, it was evaporated on a water bath to a pulp which solidified after cooling. Calcination of this mass in an oven at 500° C. for 16 hours resulted in a brittle substance, which was ground to a yellow powder. From this powder pellets, 8 mm. in diameter and 3 mm. high, were pressed and, after cutting them into two, they served as catalysts.

The tin vanadate catalyst can be manufactured also by other means, e.g. by addition of tin oxide to fused vanadium oxide.

The partial oxidation of isoprene with air over a tin vanadate catalyst takes place at lower temperatures than over pure vanadium oxide or other metal oxide catalysts. Thereby it is not necessary that the total amount of catalyst be present as tin vanadate or that its composition formula be $2SnO_2 \cdot V_2O_5$. The weight ratio of the two components $V_2O_5$ and $SnO_2$ of the catalyst can vary between 10:1 and 1:10 without appreciable disadvantage for the activity of the catalyst at lower temperatures.

From an economical point of view, for the purpose of manufacture on a technical scale, isoprene containing hydrocarbon mixtures, which are obtained in technical processes, can be used in place of the pure isoprene used in the experiments.

It has been found to be advantageous to employ within the mentioned limits shorter contact times at higher temperatures or longer contact times at lower temperatures.

Gases containing oxygen along with inert components, e.g. combustion gases with excess oxygen, can be used in place of pure oxygen or air. The mole ratio of isoprene to oxygen in the feed gas must be between 1:10 and 1:200.

What we claim is:

1. A process for the manufacture of citraconic acid anhydride by catalytic gas phase oxidation which comprises reacting a gas containing isoprene in mixture with oxygen or oxygen-containing gases at temperatures between 200° C. and 500° C. over a $V_2O_5$-catalyst.

2. A process according to claim 1, wherein essentially pure isoprene is reacted with gases containing oxygen along with inert gas at temperatures between 200° C. and 500° C. over a $V_2O_5$ catalyst.

3. A process according to claim 1, wherein the reaction is effected over a catalyst containing $SnO_2$ and $V_2O_5$.

4. A process according to claim 1, wherein the reaction is effected in the temperature range of 250° C. to 400° C.

5. A process according to claim 1, wherein the reaction is effected with a mixture of isoprene and air in the ratio of 1 volume of isoprene to 80 to 200 volumes of air, and in the temperature range of 275° C. to 300° C. over a $V_2O_5$-catalyst.

6. A process according to claim 5, wherein the reaction is effected over a catalyst containing $SnO_2$ and $V_2O_5$.

7. A process according to claim 1, wherein a contact time with the catalyst of 0.05 to 5 seconds is employed.

8. A process according to claim 1, wherein a contact time with the catalyst of about 0.5 second is employed.

9. A process for the manufacture of citraconic acid anhydride by catalytic gas phase oxidation which comprises reacting a gaseous mixture of isoprene aid air, said mixture containing 1 volume of isoprene to 80–200 volumes of air, at a temperature between 250° C. and 400° C. over a catalyst of the formula $2SnO_2 \cdot V_2O_5$.

10. A process according to claim 9, wherein the reaction is effected at a temperature between 275° C. and 300° C.

11. A process according to claim 10, wherein essentially pure isoprene is reacted with air.

12. A process according to claim 11, wherein a contact time with the catalyst of 0.05 to 5 seconds is employed.

References Cited

UNITED STATES PATENTS

| 2,537,568 | 1/1951 | Beach | 260—346.8 |
| 2,674,582 | 4/1954 | Darby | 260—346.8 |
| 3,325,516 | 4/1967 | Fettis et al. | 260—346.8 |

ALEX MAZEL, Primary Examiner

BERNARD I. DENTZ, Assistant Examiner